(12) United States Patent
Frederick et al.

(10) Patent No.: US 10,641,614 B2
(45) Date of Patent: May 5, 2020

(54) ELECTRONICALLY PROVIDED GUIDED TOURS

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 291 days.

(21) Appl. No.: 15/633,856

(22) Filed: Jun. 27, 2017

(65) Prior Publication Data

US 2018/0372505 A1  Dec. 27, 2018

(51) Int. Cl.
*G01C 21/36* (2006.01)
*G01C 21/34* (2006.01)
*G09B 29/00* (2006.01)

(52) U.S. Cl.
CPC ....... *G01C 21/3679* (2013.01); *G01C 21/343* (2013.01); *G01C 21/3423* (2013.01); *G01C 21/3644* (2013.01); *G09B 29/008* (2013.01)

(58) Field of Classification Search
CPC .............. G01C 21/3679; G01C 21/343; G01C 21/3423; G01C 21/3644; G09B 29/008
See application file for complete search history.

(56) References Cited

U.S. PATENT DOCUMENTS

| | | | |
|---|---|---|---|
| 6,526,351 B2 | 2/2003 | Whitham | |
| 9,036,026 B2 | 5/2015 | Dellantoni et al. | |
| 9,074,907 B2 | 7/2015 | Chen et al. | |
| 2003/0229446 A1 | 12/2003 | Boscamp et al. | |
| 2012/0131212 A1* | 5/2012 | Tang | G01C 21/3423 709/228 |
| 2014/0258269 A1 | 9/2014 | Slifer | |
| 2015/0032366 A1* | 1/2015 | Man | H04W 4/046 701/412 |
| 2015/0350844 A1* | 12/2015 | Agarwal | H04W 4/029 455/456.2 |

* cited by examiner

*Primary Examiner* — Alan D Hutchinson
(74) *Attorney, Agent, or Firm* — Christopher G. Darrow; Darrow Mustafa PC (57) ABSTRACT

Various arrangements for providing a guided tour are described herein. Generally, the guided tour system determines the location of location sensor(s) along a guided tour. When the location sensor(s) are located at a transition location along a guided tour, the guided tour system selects an active Input/Output (I/O) system for a subsequent segment of the guided tour. The active I/O system is used to render prompts associated with POIs along the guided tour.

20 Claims, 4 Drawing Sheets

FIG. 2

Guided Tour for NYC

| Stop # | Location | Typical Wait Time | Time Spent | |
|---|---|---|---|---|
| 1 | St. Patrick's Cathedral | 15 minutes | 30 minutes | Y/N |
| 2 | *Times Square* | 0 minutes | 2 hours | Y/N |
| 2A | *M&M Factory* | | | Y/N |
| 2B | *Discovery Times Square* | | | Y/N |
| 2C | *Hard Rock Cafe* | | | Y/N |
| 3 | Empire State Building | 45 minutes | 45 minutes | Y/N |
| 4 | 9/11 Memorial | 35 minutes | 2 hours | Y/N |
| 5 | Wall Street | 0 minutes | 45 minutes | Y/N |

ELECTRONICALLY PROVIDED GUIDED TOURS

TECHNICAL FIELD

The present disclosure is directed to guided tours and, more particularly, to switching between devices for outputting prompts associated with guided tours.

BACKGROUND

In many large cities, people pay for guided tours on scooters, buses, boats, etc. These tours go on a specified route through the city, and give information about the history of the sites, their architectural significance or various other types of information. Some tours even stop at various restaurants, museums or pubs. In general, these tours need to be booked in advance so that tour guides can meet at a specific place and time.

Furthermore, some guided tours may be conducted wholly from within a vehicle. These tours similarly drive along a specific route through the city and give information to the people on the tour.

SUMMARY

Generally, the present disclosure is directed to controlling how prompts for guided tours are provided when a guided tour includes at least one point of interest (POI) that is for an in-vehicle segment and at least POI that is for an out-of-vehicle segment. In one example, disclosed systems/methods selectively switch between controlling Input/Output (I/O) systems of different devices including, for example, a mobile device and a vehicle. In this way, the noted systems/methods can provide contextual prompt(s) associated with a POI based, at least in part, on whether the POI is along the in-vehicle segment or an out-of-vehicle segment of the guided tour.

In one example, a guided tour system for providing electronically guided tours that include one or more points of interest (POIs) is disclosed. The guided tour system can include a processor. The guided tour system can also include memory operatively connected to the processor. The memory can store a prompt generation module including instructions that, when executed by the processor, cause the processor to, responsive to determining that a current tour is located at a transition location along a guided tour route, select an active Input/Output (I/O) system to be controlled for rendering prompts during an upcoming segment of the guided tour route, wherein the prompt generation module includes instructions to select the active I/O system from a plurality of I/O systems including at least one device I/O system and a vehicle I/O system as a function of, at least, a previous segment. The prompt generation module can also include instructions to render one or more prompts for the upcoming segment using the active I/O system as selected according to, at least, the previous segment.

In another example, a non-transitory computer readable medium is disclosed. The non-transitory computer readable medium can store instructions that, when executed by one or more processors, cause the one or more processors to determine a location of current tour along a guided tour route including a plurality of points of interest (POIs). The non-transitory computer readable medium can also store instructions that, when executed by the one or more processors, cause the one or more processors to, in response to determining the current tour is located at a transition location along the guided tour route, select an active Input/Output (I/O) system to be controlled for rendering prompts during an upcoming segment of the guided tour, wherein the prompt generation module includes instructions to select the active I/O system from a plurality of I/O systems including at least one device I/O system and a vehicle I/O system as a function of, at least, a previous segment and the transition location. The non-transitory computer readable medium can also store instructions that, when executed by the one or more processors, cause the one or more processors to render one or more prompts for the upcoming segment using the active I/O system as selected according to, at least, the previous segment and the transition location.

In another example, a method of controlling the providing of prompts for a guided tour is disclosed. The method can include determining a location of a current tour along a guided tour route including one or more points of interest (POIs). The method can also include, in response to determining the current tour is located at a transition location along the guided tour route, selecting an active Input/Output (I/O) system to be controlled for rendering prompts during an upcoming segment of the guided tour route, wherein the active I/O system is selected from a plurality of i/o systems including a device I/O system and a vehicle I/O system as a function of, at least, a previous segment and the transition location. The method can also include rendering one or more prompts for the upcoming segment using the active I/O system according to, at least, the previous segment and the transition location.

DETAILED DESCRIPTION

The present disclosure is directed to controlling how prompts for guided tours are provided. In one example, a guided tour system, as disclosed herein, controls a vehicle to drive to various points of interest (POIs). At a POI, the guided tour system controls various vehicle components to provide a prompt (e.g., visual/audible indicators about the POI) corresponding to the POI. However, some POIs may not be accessible by the vehicle (e.g., the POIs are off-road, within buildings, and/or otherwise not visible from a roadway). As such, an occupant of the vehicle may need to exit the vehicle to view the particular POIs that are not accessible by the vehicle. However, the occupant may not be able to receive contextual information related to the POIs that are not accessible by vehicle without purchasing or otherwise arranging another tour of the out-of-vehicle segment.

Therefore, when located at a transition location (e.g., point where the current tour transitions between an in-vehicle segment of a guided tour and an out-of-vehicle segment of the guided tour), the guided tour system generates a notification to direct an occupant to exit (or enter) the vehicle for continuing the guided tour. Further, the guided tour system, selects active Input/Output (I/O) system(s) that provide prompts at various POIs along the guided tour. Thus, the guided tour system renders prompts on the mobile device while the occupant is away from the vehicle, and within an I/O system of the vehicle while the occupant is in the vehicle. The present disclosure provides continuity of a guided tour, particularly between segments of the tour that transition between inside and outside of a vehicle.

Figure 1:
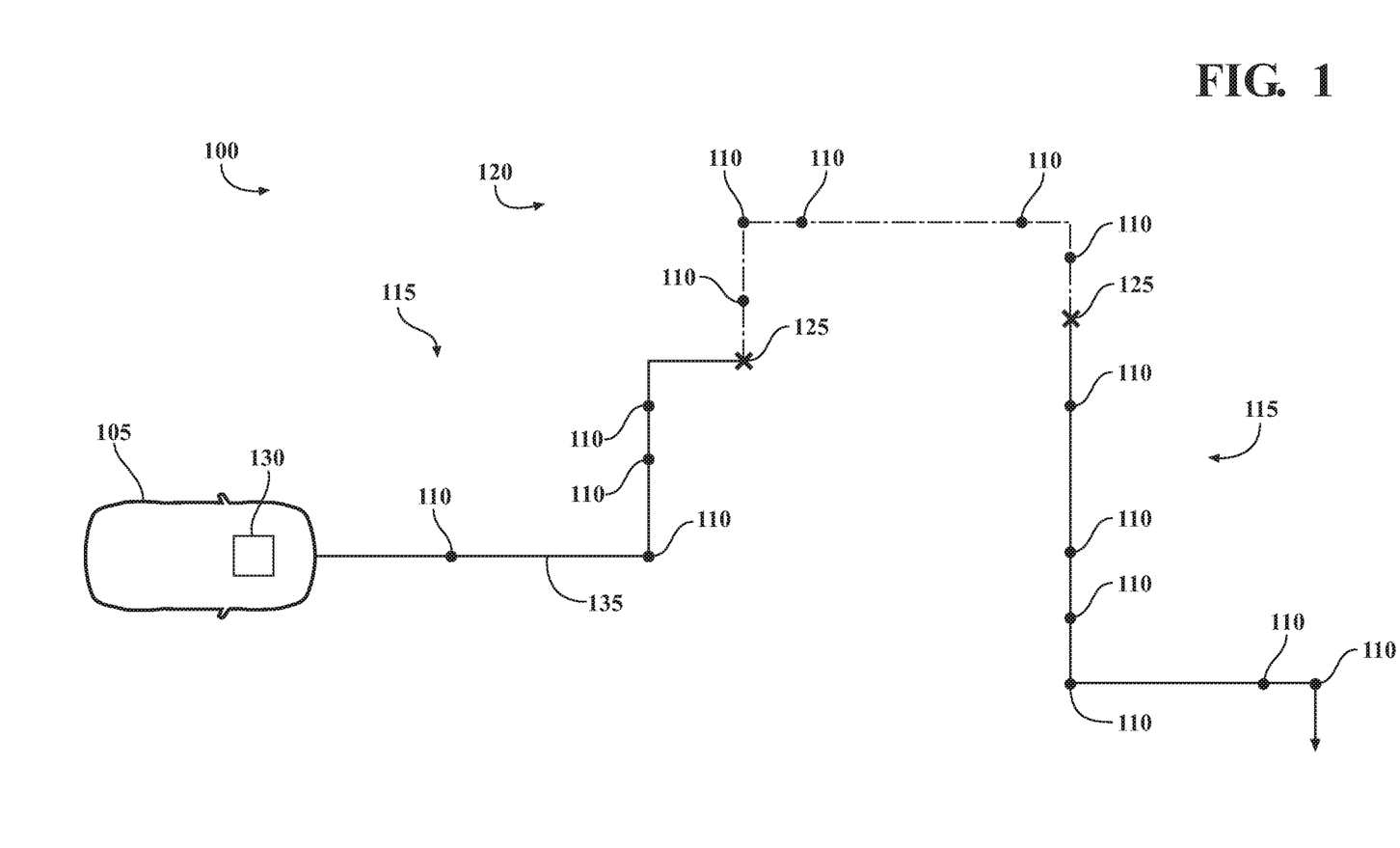
FIG. 1 shows an example guided tour route including portions conducted from inside and outside of a vehicle.

Referring now to FIG. 1, an example guided tour 100 is shown. "Guided tour," as used herein, includes an electronic data structure that stores a listing of a plurality of points of interest (POIs) 110 along with respective locations associated therewith. The guided tour 100 can also include electronic and/or graphical prompts associated with respective POIs 110. Each of the prompts can include data that, when executed by a device, causes the device to render the prompt and thereby provide information related to the POI 110 to person(s) on the guided tour 100.

As shown, some POIs 110 are positioned along an in-vehicle segment 115 of the guided tour 100 (e.g., those shown in FIG. 1 that are connected by a solid line), and some POIs 110 are positioned along an out-of-vehicle segment 120 of the guided tour 100 (e.g., those shown in FIG. 1 that are connected by a dashed line). Additionally, the guided tour 100 can include one or more transition locations 125 (designated by a cross on FIG. 1). The transition location(s) 125 can be points on the guided tour 100 defined within the electronic data structure according to GPS coordinates (or some other localizing mechanism) where the guided tour 100 electronically transitions between an in-vehicle segment 115 and an out-of-vehicle segment 120 of the guided tour 100. At the transition location(s) 125, the guided tour 100 electronically selects the device(s) upon which to render prompts for POIs 110 for the upcoming segment. As will be discussed in greater detail below, various components of the disclosed system(s) electronically select the device(s) based, at least, on the previous segment 115, 120 of the guided tour 100, and the determined location of the current tour as compared to one or more transition locations 125.

As shown in FIG. 1, there are two transition locations 125 on the example guided tour 100; a first transition location 125 where the guided tour 100 transitions from an in-vehicle segment 115 to an out-of-vehicle segment 120 of the guided tour 100, and a second transition location 125 where the guided tour 100 transitions back to the in-vehicle segment 115 of the guided tour 100. Throughout the present description, terms, such as "upcoming segment" and "previous segment" are used. These terms refer to a location along the guided tour 100 following or preceding the transition location 125. For example, at the first transition location 125, the upcoming segment may be the out-of-vehicle segment 120, and the previous segment may be the in-vehicle segment 115. As will be discussed in greater detail below, components of the present description may be selectively activated according to a location of the current tour (e.g., a determined position of persons on the tour) and the tour can thereby be provided on a mobile device 130 and/or within the vehicle 105.

At each POI 110, components of the disclosed system(s) electronically control device(s) to render prompt(s) on the device(s), and thereby provide the prompts to person(s) on the guided tour 100. The one or more prompts can be provided to a person on the guided tour 100, and can inform the person of information and/or facts related to the respective POI 110. In the example shown in FIG. 1, a vehicle 105 is traveling along the guided tour 100 route 135. The guided tour 100 includes a plurality of POIs 110. An occupant of the vehicle 105 may be on the guided tour 100. For example, the occupant may electronically select a guided tour 100 on a component/device of the vehicle 105, of the mobile device 130, etc. As the occupant continues along the guided tour 100, various device(s)/component(s) of the disclosed system(s) can determine the location of the occupants, and render prompts to provide to the occupants. One or more prompts can be provided to the occupant via one or more components/devices of the vehicle 105 and/or via a mobile device 130 for the occupant. More specifically, one or more device(s)/component(s) of the vehicle 105 can be electronically controlled to render one or more prompts to the occupant for the in-vehicle segment 115 of the guided tour 100, and one or more device(s)/component(s) of the mobile device 130 can be electronically controlled to render one or more prompts for the out-of-vehicle segment 120. The one or more prompts can be audio prompts, visual prompts, etc. and/or combinations thereof.

The disclosed system(s) can determine a route 135 between POIs 110 for the guided tour 100. In some arrangements, the route 135 can be a predetermined path between POIs 110 associated with a guided tour 100. In other arrangements, the POIs 110 and/or the route 135 therebetween can be modifiable and/or selectable according to various electronic inputs and/or parameters, as will be discussed in greater detail below. Person(s) on the guided tour 100 can follow the route 135. For example, the route 135 can be electronically presented on device(s)/component(s) of the vehicle 105, the mobile device 130, etc. The disclosed system(s) can track a location of the vehicle 105 and the mobile device 130 with respect to the route 135. Based on the location of the vehicle 105 and/or the mobile device 130, the disclosed system(s) can determine and/or estimate the location of a current tour (e.g., a determined/estimated location of person(s)) with respect to the guided tour 100 route 135. As such, the current tour can travel along the route 135 between POIs 110.

Figure 2:
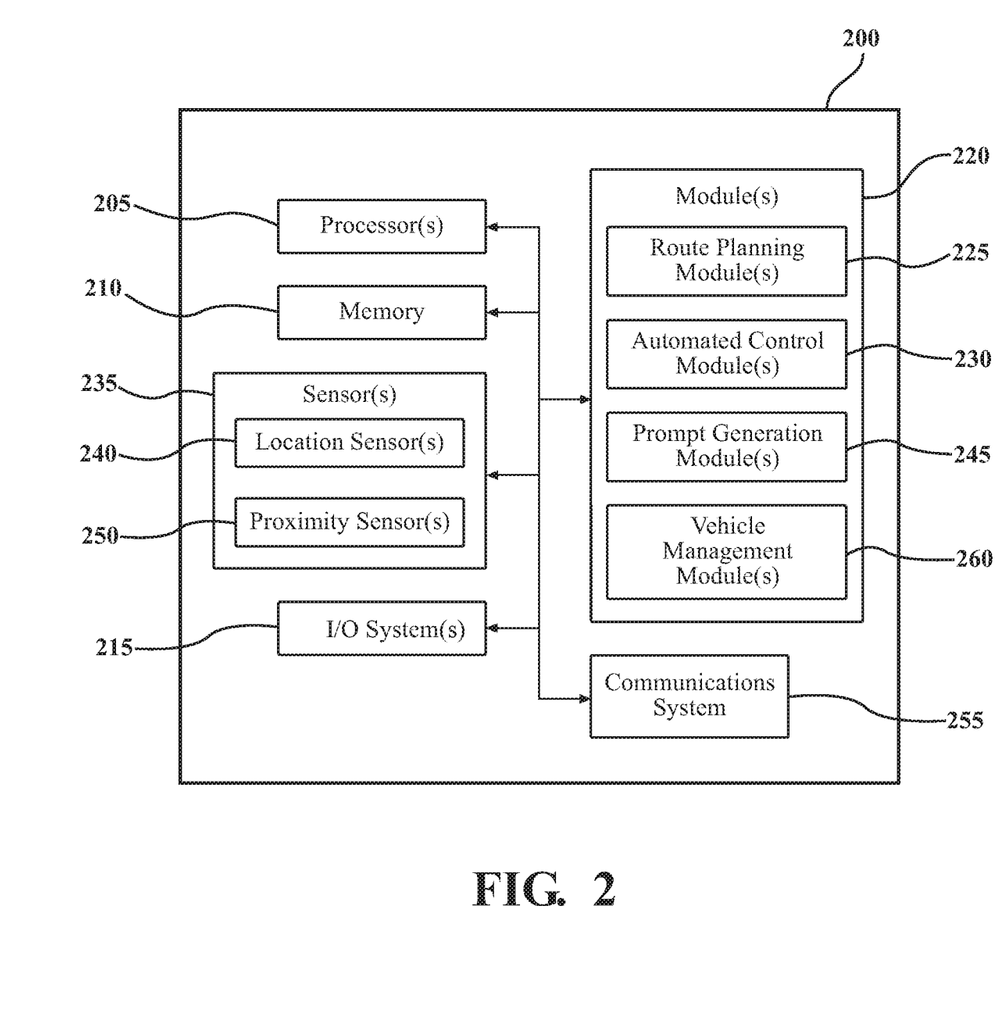
FIG. 2 shows a schematic diagram of a guided tour system.

Referring briefly to FIG. 2, a schematic diagram of a guided tour system 200 is shown. The guided tour system 200 includes several elements. Each of the elements described herein can be located wholly in the vehicle 105, wholly on the mobile device 130, remotely stored and accessible, and/or combinations thereof. Additionally, the guided tour system 200 can include elements additional to what is shown in FIG. 2. Some of the possible elements of the guided tour system 200 are shown in FIG. 2 and will be described along with subsequent figures. However, a description of several of the elements in FIG. 2 will be provided after the discussion of FIG. 2-FIG. 4 for purposes of brevity of this description.

Referring now to FIG. 1 and FIG. 2, the guided tour system 200 can include one or more processor(s) 205. The processor(s) 205 are configured to implement or perform various functions described herein. In one or more arrangements, the processor(s) 205 can be a main processor for the guided tour system 200. For instance, where incorporated into the vehicle 105, the processor(s) 205 can be an electronic control unit (ECU) for the vehicle 105. The guided tour system 200 can also include memory 210 for storing one or more types of data. The memory 210 can be a component of the processor(s) 205, or the memory 210 can be operatively connected to the processor(s) 205 for use thereby. The term "operatively connected," as used throughout this description, can include direct or indirect connections, including connections without direct physical contact. In some arrangements, the memory 210 can be stored locally (e.g., onboard the vehicle 105, on the mobile device 130, etc.). In other arrangements, the memory 210 can be stored remotely and accessible by one or more components of the guided tour system 200. In this arrangement, the memory 210 can be a cloud-based memory.

In one or more arrangements, the guided tour system 200 can include one or more input/output (I/O) system(s) 215. An "input system" includes any device, component, system, element or arrangement or groups thereof that enables information/data to be entered into a machine. The input system(s) can receive an input from a user (e.g., a person on the guided tour 100). The input system(s) can include one or more components usable by the user to provide such inputs (e.g., a touch-sensitive display, a microphone, buttons, keys, dials, etc). An "output system" includes any device, component, or arrangement or groups thereof that enable information/data to be presented to a user (e.g., a person on the guided tour 100). The output system(s) can include one or more components usable to provide such outputs to the user (e.g., a display, a speaker, lights, haptic devices, etc.). The I/O system(s) 215 are usable by a user on the guided tour 100 to exchange data, inputs, outputs, information, etc. between the person and various components of the guided tour system 200.

In some arrangements, the guided tour system 200 can include two or more I/O systems 215. For example, the guided tour system 200 can include a first I/O system 215 within the vehicle 105 (e.g., a vehicle I/O system 215), and a second I/O system 215 integrated within the mobile device 130 (e.g., device I/O system 215). In these arrangements, the guided tour system 200 can selectively control specific I/O systems 215 within the system 200 according to various parameters.

Each of the I/O system(s) 215 can include one or more operational modes. For example, each of the I/O system(s) 215 can include, at least, an active mode and an in-active mode. In the active mode, the I/O system(s) 215 can be controlled to provide prompts, and in the in-active mode, the I/O system(s) 215 can be controlled to not provide prompts. As will be discussed in greater detail below, at transition locations 125 along the guided tour 100, an active I/O system 215 can be selected from each of the I/O system(s) 215 according to the transition location 125 and the previous segment 115,120 of the guided tour 100, and thereby control which of the I/O system(s) 215 is providing prompts to person(s) on the guided tour 100.

In one or more arrangements, the memory 210 can include various instructions stored thereon. In one or more arrangements, the memory 210 can store one or more modules 220. Modules 220 can be or include computer-readable instructions that, when executed by the processor(s) 205, cause the processor(s) 205 to perform the various functions disclosed herein. While one or more modules 220 can be stored on memory 210, it should be noted the various modules 220 can be stored on and/or be a component of the processor(s) 205, can be remotely stored and accessible by the processor(s) 205, etc.

The guided tour system 200 can include one or more route planning module(s) 225. The route planning module(s) 225 can include instructions for selecting one or more POIs 110 for a guided tour 100.

In some arrangements, the route planning module(s) 225 can receive an electronic selection of a particular guided tour 100 based on an operation from a user. Based on the electronic selection, the route planning module(s) 225 can identify one or more POIs 110 associated with the guided tour 100 selected by the user. In these arrangements, a user can select, via the I/O system(s) 215, a guided tour 100 and, based on the selection, the route planning module(s) 225 can identify one or more POIs 110 associated with the guided tour 100.

The guided tour 100 can include one or more predetermined POIs 110 that are associated therewith. The route planning module(s) 225 can identify the predetermined POIs 110. In some examples, the route planning module(s) 225 presents the predetermined POIs 110 on the I/O system(s) 215 to a user. In these examples, the I/O system(s) 215 can identify electronic signals corresponding to user modifications (e.g., add, delete, substitute, etc.) of one or more POIs 110 for the guided tour 100.

In other arrangements, the route planning module(s) 225 can identify one or more POIs 110 selected by a user. In this arrangement, I/O system(s) 215 can identify signals corresponding to selections of POIs 110 from the user. The I/O system(s) 215 can transmit signals to the processor(s) 205 corresponding to selections by the user, and the processor(s) 205 can identify the selected POIs 110 via the instructions included on the route planning module(s) 225.

In still other arrangements, the route planning module(s) 225 can identify one or more POIs 110 based, at least in part, on a user profile. In this arrangement, the route planning module(s) 225 can identify a profile associated with the user of the mobile device 130 and/or vehicle 105. The person can, for example, access the Internet and, by electronically inputting data corresponding to answers about various questions or surveys, provide data corresponding to their interests. Additionally or alternatively, the profile can be automatically be set up and associated with a person based on, for example, frequently visited websites, purchases, etc. (similar to targeted advertising). The profile can include, for example, preferences on types of POIs, POIs frequently visited, desired duration at POIs, etc. The profile can also include personal information, such as any handicap requirements. In each of these arrangements, the system can receive electronic inputs, via the I/O system(s) 215, representing selections about a "customized," or "personalized," guided tour 100. The route planning module(s) 225 can access the profile associated with the person. The profile can be stored in memory 210, remotely accessible on the cloud, etc. The route planning module(s) 225 can automatically identify a suggested list of POIs 110 based on data from the person's profile.

Figure 3:
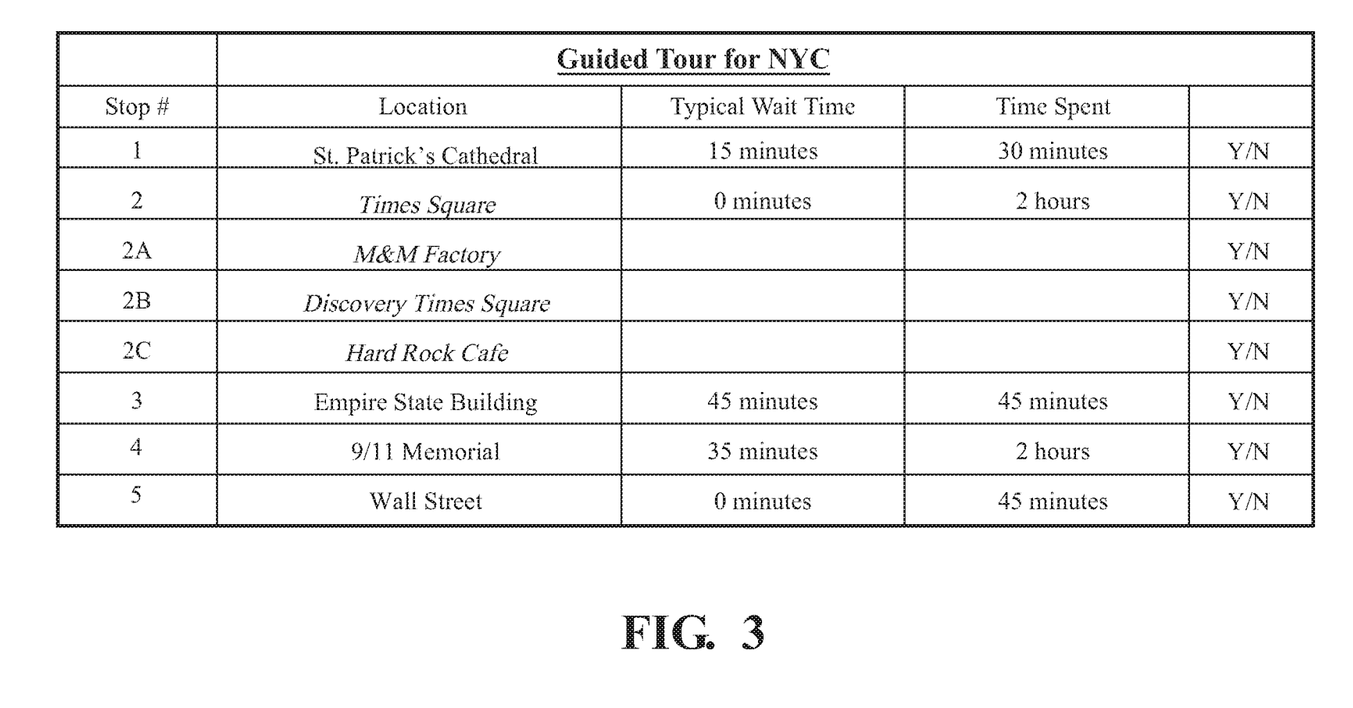
FIG. 3 shows an example list of points of interest (POIs) for the guided tour.

Referring to FIG. 3, the route planning module(s) 225 can include instructions to present, via the I/O system(s) 215, the identified one or more POIs 110 to the user. The route planning module(s) 225 can, in some examples, access electronically stored data corresponding to average wait times, typical foot traffic, time typically spent, etc. for each POI 110 presented on the list of POIs. Such data can be compiled by each POI 110, by cell phone companies or other technology companies, etc. FIG. 3 shows an example list 300 for POIs 110 in New York City. The list 300 includes various POIs 110, typical wait times to enter and/or access each POI 110, time typically spent at each POI 110, and a selection button indicating "Y/N". In this example, a person can select whether or not to visit particular POIs by selecting "Y" or "N".

In some arrangements, one or more POIs 110 on a guided tour 100 may be located along an out-of-vehicle segment 120 of the guided tour 100. For example, some POIs 110 may not be visible (or best visible) from a vehicle 105, some POIs 110 may be within a building or off-road, etc. As another example, some POIs 110 may have aspects that are best seen up close (e.g., out of the vehicle 105), and may have aspects that are visible from a vehicle 105. In this example, the POI 110 may (or may not) be along the in-vehicle segment 115 depending on the type of information provided via the prompt. The route planning module(s) 225 can access the data to determine whether or not each POI 110 on the list 300 should be in the in-vehicle segment 115 or in the out-of-vehicle segment 120 of the guided tour 100. Where the POI 110 includes aspects that are best seen up close and aspects that are visible from a vehicle 105, the route planning module(s) 225 can determine, for example, the type of information that the person typically wants to hear (based on data from a user profile). Additionally or alternatively, the route planning module(s) 225 can indicate, via the I/O system(s) 215, that the POI 110 can be observed both from the vehicle 105 and out of the vehicle 105. In this arrangement, a person can select whether or not he or she would like to exit the vehicle 105 for continuing the guided tour 100.

The POIs 110 along the out-of-vehicle segment 120 of the guided tour 100 can be emphasized in the list 300 (e.g., italicized as shown, underlined, bolded, etc.). As will be discussed in greater detail below, where a guided tour 100 includes POIs 110 along an out-of-vehicle segment 120, the guided tour system 200 can switch modes for the I/O system(s) 215 and thereby provide prompts for POIs 110 via the vehicle 105 for POIs 110 along the in-vehicle segment 115 of the guided tour 100, and via the mobile device 130 for POIs 110 along the out-of-vehicle segment 120.

Referring back to FIG. 1 and FIG. 2, when the person accepts the one or more POIs 110 on the list 300, the route planning module(s) 225 include instructions for generating a route 135 between the POIs 110 along the tour guide 100. The route 135 can be generated based on nearest POIs, traffic, street and/or roadway configurations, etc. The route 135 between the POIs 110 can include an in-vehicle segment 115 of a guided tour 100 route 135 and an out-of-vehicle segment 120.

In one or more arrangements, the guided tour system 200 can include one or more automated control module(s) 230. As will be discussed in greater detail below, the automated control module(s) 230 can include instructions that cause the processor(s) 205 to determine motion of the vehicle 105. For example, the automated control module(s) 230 can determine a speed of the vehicle 105, an acceleration of the vehicle 105, a rotation of the vehicle 105, a direction (e.g., heading) of the vehicle 105, etc.

The automated control module(s) 230 can include instructions for determining a route to follow. The route can be between the current location of the vehicle 105 and another location. In the disclosed examples, the other location can be, in some instances, one of the POIs 110 along the guided tour 100. The route determined by the automated control module(s) 230 can follow the route 135 along the in-vehicle segment 115 of the guided tour 100.

As will be discussed in greater detail below, the automated control module(s) 230 can cause the vehicle 105 to execute the one or more maneuvers. While this example is described, it should be understood that the vehicle 105 can be controlled by a driver. For example, the driver can cause the vehicle 105 to implement the one or more driving maneuvers. In some instances, the automated control module(s) 230 (or the driver) can cause the vehicle 105 to be located at a POI 110 along the guided tour 100. In this regard, the automated control module(s) 230 and/or the driver can cause the vehicle 105 to drive along the in-vehicle segment 115 route 135 for the guided tour 100, and the processor(s) 205 can control one or more I/O systems 215 that cause the I/O system(s) 215 to provide prompts to person(s) on the guided tour 100.

The guided tour system 200 can include one or more sensor(s) 235. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the guided tour system 200 includes a plurality of sensors 235, the sensors can work independently from each other. Alternatively, two or more of the sensors can work in combination with each other. In such case, the two or more sensors 235 can form a sensor network. The sensor(s) 235 can be operatively connected to the processor(s) 205, the memory 210, and/or another element of the guided tour system 200 (including any of the elements shown in FIG. 2).

The guided tour system 200 can include one or more location sensors 240. The location sensor(s) 240 can be any component or group of components configured to detect and/or sense a position, location, and/or orientation. The location sensor(s) 240 can capture the position of the location sensor(s) 240 in global coordinates based on signals from a plurality of satellites. A plurality of satellites can be used to estimate the position and velocity of the location sensor(s) 240 using three-dimensional triangulation and time estimation. The location sensor(s) 240 can be positioned on and/or within the vehicle 105 and/or the mobile device 130. The location sensor(s) 240 can be used to determine the location of the vehicle 105 and/or mobile device 130. Alternatively or in addition, the guided tour system 200 can use any other data and/or signals from any other sensors 235 usable to determine the current location of the vehicle 105 and/or mobile device 130. The data captured or otherwise generated by the location sensor(s) 240 can be used for determining the location of the current tour with respect to one or more points (POIs 110, transition locations 125, etc.) along the route 135 for the guided tour 100. In this regard, the location of the location sensor(s) 240 can be used by various component(s)/device(s) of the guided tour system 200 to electronically estimate and/or determine the location of the current tour.

The guided tour system 200 can include one or more prompt generation modules 245. The prompt generation module(s) 245 can include instructions that cause the processor(s) 205 to select a prompt to render on the I/O system(s) 215.

In some arrangements, each POI 110 includes a plurality of prompts associated therewith. The prompts can be stored locally (e.g., on memory 210), on the cloud, etc. Each of the plurality of prompts can be different from one another. For example, some prompts can be more detailed, while other prompts can be more concise. As another example, some prompts can be directed towards architecture, while other prompts can be directed towards historical facts. Additionally, where a POI 110 includes both aspects that can be seen in the vehicle 105 and out of the vehicle 105, the POI 110 can include prompt(s) associated with each of these aspects. While these examples are provided, the present disclosure is not limited to these examples. To the contrary, prompts can be sorted according to subject matter, duration, etc. As stated, each of the plurality of prompts can be associated with a particular POI 110.

The prompt generation module(s) 245 can include instructions for selecting which prompt to render on the I/O system(s) 215. In one or more arrangements, and as previously stated, each person can have an associated user profile. The user profile can electronically store data itemizing preferences on, for example, desired subject matter, desired duration of prompts, etc. The prompt generation module(s) 245 can select a prompt to render based, at least in part, on data from the user profile associated with the person(s) on the guided tour 100. In this regard, the I/O system(s) 215 can be controlled to render electronic prompts about information regarding POIs 110 on the guided tour 100 that is customized to the user's preferences.

In one or more arrangements, the guided tour system 200 can include one or more proximity sensor(s) 250. The proximity sensor(s) 250 can be any component or group of components usable to detect a relative location and/or distance between two devices. In some examples, the proximity sensor(s) 250 are configured to detect a relative location/distance between two or more devices. In other examples, the proximity sensor(s) 250 are configured to detect a location of each respective device, and based on each detected location, the processor(s) 205 can determine the relative location/distance between the two or more devices. In some arrangements, several mobile devices 130 can have a respective proximity sensor 250. In these arrangements, a group of people can be on a guided tour 100 together, with each person having a respective mobile device 130. The proximity sensor(s) 250 can be configured to detect the relative distance between mobile device(s) 130 (and, by association, people) in the same group on the guided tour 100.

In arrangements where the guided tour system 200 includes proximity sensor(s) 250, the prompt generation module(s) 245 can select a prompt to render via the I/O system(s) 215 based on the determined relative position/location of proximity sensor(s) 250. For example, the prompt generation module(s) 245 can select a more concise prompt to render on an I/O system 215 for a person who is behind other people in the same group on the guided tour 100. Similarly, the prompt generation module(s) 245 can select a more detailed prompt to render on I/O system(s) 215 for people who are ahead of others in the same group. As a result, prompts can be selected and rendered on respective I/O system(s) 215 such that people in the same group can complete the guided tour 100 at the same time or substantially the same time.

As another example, the prompt generation module(s) 245 can select a prompt to render for the POI 110 based on whether or not the person is electronically determined to be within the vehicle 105 or outside the vehicle 105. More specifically, the prompt generation module(s) 245 can select a prompt for the POI 110 based on whether the POI 110 is located along the in-vehicle segment 115 or out-of-vehicle segment 120. In this example, the POI 110 may have aspects that are best seen out of the vehicle 105, and aspects that can be seen within the vehicle 105. The I/O system(s) 215 can receive an electronic selection (from a user) indicating whether the user wishes to observe the POI 110 from within the vehicle 105. Based on the selection, the prompt generation module(s) 245 can select a prompt to render on the I/O system(s) 215 for the POI 110.

As previously stated, the guided tour system 200 can include location sensor(s) 240. The data stored for each POI 110 can include location data. For example, the location data can include coordinates. The locations associated with the POIs 110 can be stored on memory 210, remotely accessible (e.g., on the cloud), etc. The prompt generation module(s) 245 can compare the current location of the location sensor(s) 240 with the location(s) associated with each POI 110.

When the location, as detected by the location sensor(s) 240, matches (or substantially matches) the location associated with a POI 110, the prompt generation module(s) 245 render the prompt on the I/O system(s) 215 and thereby provide the prompt to one or more persons on the guided tour 100. The prompt generation module(s) 245 can generate one or more signals for the I/O system(s) 215 that cause the I/O system(s) 215 to render the prompt selected via the prompt generation module(s) 245.

The prompt generation module(s) 245 can include instructions to electronically select which I/O system(s) 215 to operate. In some examples, the prompt generation module(s) 245 can determine whether the POI 110 that the location sensor(s) 240 are currently located at is along the in-vehicle segment 115 or out-of-vehicle segment 120 of the guided tour 100. Additionally, the prompt generation module(s) 245 can determine the state (e.g., active or in-active) for each of the I/O system(s) 215.

In one aspect, the prompt generation module(s) 245 includes instructions to control the active I/O system(s) 215 and cause the I/O system(s) 215 to render the selected prompt associated with the POI 110. In some arrangements, the prompt can be an audio prompt, a visual prompt, and/or a combination thereof.

In one or more arrangements, the prompt generation module(s) 245 includes instructions for determining whether the location sensor(s) 240 are located at a transition location 125. As previously stated, the transition location 125 can be a location where the guided tour 100 transitions between an in-vehicle segment 115 of the guided tour 100 and an out-of-vehicle segment 120. The prompt generation module(s) 245 can compare data corresponding to the location of the location sensor(s) 240 with data corresponding to the location of a transition location 125 along the route 135. The prompt generation module(s) 245 can electronically determine that the current tour (via data from the location sensor(s) 240) is located at a transition location 125 responsive to the locations of the location sensor(s) 240 and transition location 125 matching (or substantially matching).

When the current tour is located at a transition location 125, the prompt generation module(s) 245 generates, for example, a notification prompt on one or more of the I/O system(s) 215. In some arrangements, the prompt generation module(s) 245 can generate the notification on the active I/O system(s) 215. The notification can direct a person to exit or enter the vehicle 105 for continuing the guided tour 100. For example, where the transition location 125 is for a transition from an in-vehicle segment 115 of a guided tour 100 to an out-of-vehicle segment 120, the notification can direct an occupant of the vehicle 105 to exit the vehicle 105 for continuing the guided tour 100. Similarly, where the transition location 125 is for a transition from an out-of-vehicle segment 120 of a guided tour 100 to an in-vehicle segment 115, the notification can direct a person to enter the vehicle 105 for continuing the guided tour 100.

In some arrangements, the prompt generation module(s) 245 can confirm that the mobile device 130 exited/entered the vehicle 105 based on data from proximity sensor(s) 250 integrated within the mobile device 130. In some examples, the vehicle 105 can also include proximity sensor(s) 250. The prompt generation module(s) 245 can use data from the proximity sensor(s) 250 of the vehicle 105 and proximity sensor(s) 250 of the mobile device(s) 130 to electronically determine whether a user carrying the mobile device 130 exited/entered the vehicle 105. In other examples, the I/O system(s) 215 can generate the notification prompt and, subsequently, a confirmation prompt. The I/O system(s) 215 can receive a selection of, for example, a confirmation button on the I/O system(s) 215 usable to indicate that the user exited/entered the vehicle 105.

Additionally, when the location sensor(s) 240 are determined to be located at a transition location 125 (and, optionally, the person's entrance/exit has been electronically confirmed), the prompt generation module(s) 245 can electronically select an active I/O system 215 from the I/O system(s) 215. The prompt generation module(s) 245 can electronically select the active I/O system 215 according to the previous segment. For example, where the transition location 125 is for a transition from an in-vehicle segment 115 of a guided tour 100 to an out-of-vehicle segment 120, the prompt generation module(s) 245 can electronically select the vehicle I/O system(s) 215 to be active. Similarly, where the transition location 125 is for a transition from an out-of-vehicle segment 120 of a guided tour 100 to an in-vehicle segment 115, the prompt generation module(s) 245 can electronically select the device I/O system(s) 215 to be active. In this regard, the prompt generation module(s) 245 can electronically select upon which of the I/O system(s) 215 to render prompts for providing to users who are on the guided tour 100. The prompt generation module(s) 245 can electronically control the device I/O system(s) 215 to render prompts for the out-of-vehicle segment 120 and thereby conduct the current tour outside of the vehicle 105 using the device I/O system(s) 215. Similarly, the prompt generation module(s) 245 can electronically control the vehicle I/O system(s) 215 to render prompts for the in-vehicle segment 115 and thereby conduct the current tour within the vehicle 105. As such, when the current tour is determined to be located at a transition location 125, the prompt generation module(s) 245 can electronically select different I/O system(s) 215 to control for rendering prompts during the upcoming segment 115, 120, which may be different than the previous segment 120, 115.

In one or more arrangements, the guided tour system 200 can include one or more communications systems 255. The communications system(s) 255 can be any component or group of components operable to transmit data over a distance. In some arrangements, the communications system(s) 255 can communicate data over various networks, such as a cellular network, Wi-Fi, Bluetooth, etc. In some examples, the vehicle 105 can include a communications system 255, and any mobile device(s) 130 can include a communications system 255. In these examples, the vehicle 105, the mobile device(s) 130, and/or other components within the guided tour system 200 can control respective communication systems 255 and thereby communicate data or other information amongst each other.

In some arrangements, the I/O system(s) 215 can receive an electronic selection of one or more inputs to transmit. For example, a device I/O system 215 can be located along an out-of-vehicle segment 120 of the guided tour 100, and a user can select an input on the device I/O system 215. The device I/O system 215 can identify the selected input from the user. In some examples, the selected input may be an interrupt input. The interrupt input can include an electronic data structure that corresponds or otherwise indicates that the person would like to interrupt the guided tour 100 and be picked up by a vehicle. The communications system 255 for the mobile device 130 can transmit data corresponding to the interrupt input to one or more other components of the guided tour system 200. The data can include, for example, a signal indicating a selection of the interrupt input, data corresponding to the location of the location sensor(s) 240 for the mobile device 130 (and, by association, the person), etc.

In some arrangements, the communications system(s) 255 can automatically transmit and/or receive data. For example, processor(s) 205 for the vehicle 105 and/or mobile device(s) 130 can control respective communications system(s) 255 to automatically transmit/receive data representing and/or corresponding to the location of respective location sensor(s) 240 and/or respective proximity sensor(s) 250. For example, the processor(s) 205 can control the communications system(s) 255 to transmit the data corresponding to locations of the location sensor(s) 240, proximity sensor(s) 250 determined location of the current tour, etc., continuously, near-continuously, in intervals, etc. Such data can be used by various components and/or devices of the disclosed system to track the location of the current tour along the guided tour 100 route 135, scheduling pick-ups of one or more person(s), etc.

In some arrangements, the guided tour system 200 can include one or more vehicle management modules 260. The vehicle management module(s) 260 can include instructions to electronically determine/identify a pick-up location. The pick-up location may be a location along the guided tour 100 where person(s) on the current tour directed to travel to for continuing the guided tour 100. In some arrangements, the pick-up location identified by the vehicle management module(s) 260 is the same as a transition location 125 for transitioning between an out-of-vehicle segment 120 of a guided tour 100 and an in-vehicle segment 115. In this regard, the transition location 125 can be a predetermined meeting point for the guided tour 100. In other arrangements, the pick-up location can be a location different from the transition location 125. For example, the I/O system(s) 215 can receive a selection of an interrupt input, as previously discussed. In this example, the I/O system 215 may be a device I/O system 215 integrated within a mobile device 130, and the mobile device 130 may be located along an out-of-vehicle segment 120. The processor(s) 205 can receive data corresponding to the interrupt input via respective communications system(s) 255, and the vehicle management module(s) 260 can identify a pick-up location. Where the device I/O system(s) 215 receives a selection of an interrupt input, the vehicle management module(s) 260 can identify a pick-up location that is nearest to the device I/O system 215 based on data from, for example, location sensor(s) 240, proximity sensor(s) 250 etc., of the device I/O system 215. In some examples, the pick-up location can still be the transition location 125. In other examples, the pick-up location can be a location nearer to the device I/O system 215.

The vehicle management module(s) 260 can transmit, via the communications system 255, the pick-up location to a vehicle for the vehicle to proceed to the pick-up location. The vehicle management module(s) 260 can also transmit the pick-up location to one or more mobile device(s) 130. In some arrangements, the vehicle receiving the pick-up location can be the same vehicle as vehicle 105. In this regard, the same vehicle 105 can drop off person(s) at the transition location 125, and pick up the person(s) at a subsequent pick-up location (in some examples, subsequent transition location 125). In other arrangements, a first vehicle can drop off person(s) at the transition location 125, and a second vehicle can pick-up the person(s) at the subsequent pick-up location.

In some arrangements, the vehicle receiving the pick-up location can transmit, via the communication system 255, an estimated time of arrival (ETA) to other device(s) (such as the mobile devices 130) that are on the guided tour 100. For example, the ETA can be transmitted, via the communications system 255, to a communications system 255 for the mobile device 130, and processor(s) 205 for the mobile device 130 can control the device I/O system(s) 215 to display or otherwise render the ETA. This example is particularly relevant when the one or more mobile device(s) 130 are determined to be located along an out-of-vehicle segment 120 of the guided tour 100. A person, using the mobile device(s) 130, can determine where the person is to be picked-up (and at what time) based on one or more outputs from the device I/O system(s) 215.

In one or more arrangements, the device I/O system(s) 215 can include or otherwise render buttons or other controls for adjusting the ETA. In these arrangements, the device I/O system(s) 215 can receive a selection of one or more time adjustment inputs (e.g., add time or subtract time), and the processor(s) 205 for the mobile device 130 can generate time adjustment signal(s) to communicate to the vehicle to adjust the ETA.

Figure 4:
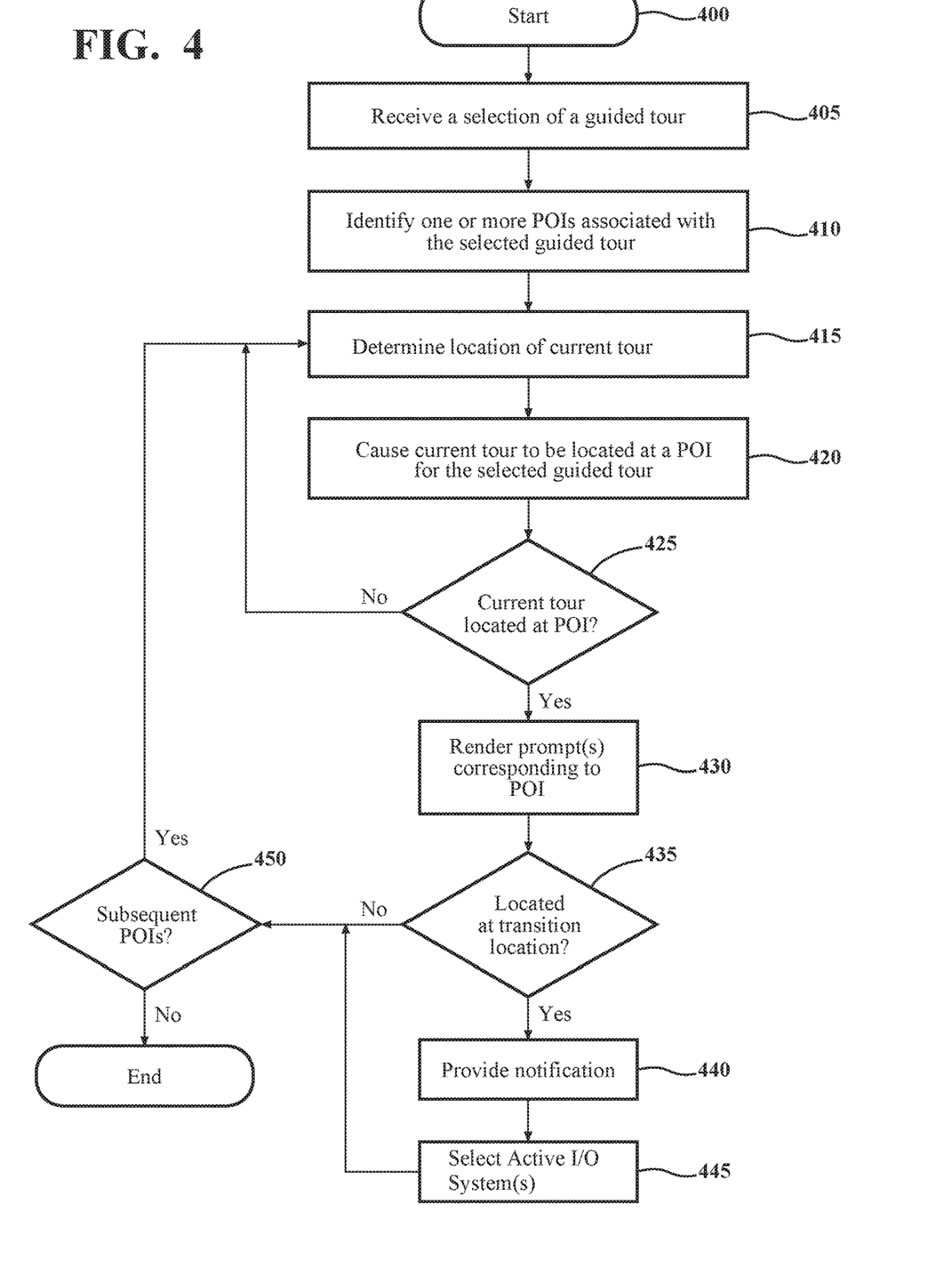
FIG. 4 shows a flowchart depicting an example method of controlling the providing of prompts for a guided tour.

Referring now to FIG. 4, a flowchart depicting an example method of providing a guided tour will be described. The flowchart shown in FIG. 4 is only for exemplary purposes. The following disclosure should not be limited to each and every function block shown in FIG. 4. To the contrary, the method does not require each and every function block shown. In some examples, the method can include additional function blocks. Further, the method does not need to be performed in the same chronological order shown in FIG. 4.

The method can begin at starting block 400. At starting block 400, the method can begin. The method can begin when the vehicle 105 and/or mobile device 130 are turned on, when an application on the vehicle 105 and/or mobile device 130 is selected, etc. The method can continue to function block 405.

At function block 405, the route planning module(s) 225, in one example, receives an electronic selection of a guided tour 100. The guided tour 100 can be selected via vehicle I/O system(s) 215 and/or device I/O system(s) 215. The vehicle 105 and/or mobile device 130 can receive an electronic selection of a guided tour 100 via an application running on the vehicle 105 and/or mobile device 130. In some arrangements, the route planning module(s) 225 receives an electronic selection of one or more POIs 110 and the route planning module(s) 255 electronically generates a guided tour 100. In other arrangements, the route planning module(s) 225 receives an electronic selection of a predetermined (or preset) guided tour 100. In one or more arrangements, the I/O system(s) 215 are usable to modify the selected guided tour 100. The method can continue to function block 410.

At function block 410, the route planning module(s) 225 can identify one or more POIs 110 associated with the guided tour 100 selected at function block 405. In some examples, the route planning module(s) 225 can receive the selection of a guided tour 100 at function block 405 and, at function block 410, the route planning module(s) 225 can identify predetermined POIs 110 associated with the selected guided tour 100. In other examples, the route planning module(s) 225 can identify POIs 110 that were received at function block 405. In still other examples, the route planning module(s) 225 can render a list 300 of POIs 110 associated with the selected guided tour 100 on the I/O system(s) 215, and the I/O system(s) 215 can include one or more inputs for modification of the list 300, thereby permitting a user to modify the guided tour 100 according to the person's preferences. The route planning module(s) 225 can identify the POIs 110 on the modified list 300. The method can continue to function block 415.

At function block 415, the route planning module(s) 225 can determine the location of the current tour. In some arrangements, the location of the current tour can be based on the determined location of location sensor(s) 240. The route planning module(s) 225 can determine the location of the current tour with respect to first (and subsequent) POIs 110. The route planning module(s) 225 can receive data from the location sensor(s) 240 corresponding to the current location of the location sensor(s) 240. As previously stated, the location sensor(s) 240 can be incorporated within the mobile device 130, within the vehicle 105, and/or both within the mobile device 130 and the vehicle 105. The route planning module(s) 255 can use data from the location sensor(s) 240 for electronically determining/estimating a location of the current tour with respect to the guided tour 100 route 135. The method can continue to function block 420.

At function block 420, the route planning module(s) 225 causes the location of the current tour is caused to be located at a POI 110 for the selected guided tour 100. The route planning module(s) 225 can electronically generate a route 135 to one or more POIs 110 (e.g. a first or a subsequent POI). In some arrangements, particularly those where the vehicle 105 is an automated vehicle, the automated control module(s) 230 causes the vehicle 105 to be located at the one or more POIs 110. The route planning module(s) 225 can generate the route 135 to one or more POIs 110, and the automated control module(s) 230 can implement the route 135. In other arrangements, particularly those where the vehicle 105 is, at most, a semi-autonomous vehicle, the route planning module(s) 225 presents the route 135 on vehicle I/O system(s) 215. A driver can, for example, follow the route 135 presented on the vehicle I/O system(s) 215. In arrangements where the POIs 110 are located along an out-of-vehicle segment 120 of the guided tour 100, the route 135 can be presented on device I/O system(s) 215. In this arrangement, one or persons can, for example, follow the route 135 presented on the device I/O system(s) 215. The method can continue to decision block 425.

At decision block 425, the prompt generation module(s) 245 can electronically determine whether the current tour is located at a POI 110. The prompt generation module(s) 245 can compare the estimated/determined location of the current tour (based on data from the location sensor(s) 240) to one or more electronically stored locations associated with the POI 110. If the locations sufficiently match (e.g., are the same or substantially the same), the prompt generation module(s) 245 can execute instructions according to function block 430. If the locations do not sufficiently match, the method can continue back to function blocks 415 and 420, where the route planning module(s) 225 determine the location of the current tour and cause the current tour to be located at the POI 110.

At function block 430, the prompt generation module(s) 245 can electronically control one or more active I/O system(s) 215 to render one or more prompts. The active I/O system(s) 215 can render the prompts, and thereby provide the prompts to a person on the guided tour 100. In some arrangements, the prompt generation module(s) 245 can electronically select upon which I/O system(s) 215 to render the prompt. In these arrangements, the vehicle 105 and at least one mobile device 130 can each include respective I/O system(s) 215. The prompt generation module(s) 245 can select upon which I/O system(s) 215 to render the prompt based on which of the I/O system(s) 215 are active. The prompt generation module(s) 245 can electronically identify the current mode for each the I/O system(s) 215. The prompt generation module(s) 245 can operate the I/O system(s) 215 according to the current mode. For example, where the I/O system(s) 215 are in the active mode, the prompt generation module(s) 245 can electronically control the active I/O system(s) 215 to cause the active I/O system(s) 215 to render the prompt(s).

In some examples, the prompt generation module(s) 245 can electronically select one or more prompts from a plurality of prompts associated with the same POI 110. The prompt generation module(s) 245 can electronically control the active I/O system(s) 215 to render the selected prompt(s), and thereby provide the selected prompt(s) to one or more persons on the guided tour 100. The prompt generation module(s) 245 can select one or more prompts based on, for example, data from a user profile corresponding to personal preferences, data from proximity sensor(s) usable to determine and/or estimate a proximity amongst group members on the same guided tour 100, etc.

As previously stated, the prompts can provide contextual information to one or more persons on the guided tour 100. The contextual information can include, for example, historical, architectural, or other types of facts about each of the POIs 110. The prompts can be audio prompts, visual prompts, etc. and/or combinations thereof. The method can continue to decision block 435.

At decision block 435, the prompt generation module(s) 245 can determine whether the current tour is located at a transition location 125. As stated above, the transition locations 125 can be a location along the route 135 where the guided tour 100 transitions between an in-vehicle segment 115 of the guided tour 100 and an out-of-vehicle segment 120. The prompt generation module(s) 245 can estimate/determine, based on data from the location sensor(s) 240, the location of the current tour. The prompt generation module(s) 245 can compare the location of the current tour (based on data from the location sensor(s) 240) to electronically stored data corresponding to one or more transition location(s) 125 along the route 135. If the locations sufficiently match (e.g., are the same or substantially the same) the method can continue to function block 440. However, if the locations do not sufficiently match, the method can continue to decision block 450.

At function block 440, the prompt generation module(s) 245 can control the I/O system(s) 215 to render a notification for providing to one or more person(s) on the guided tour 100. For example, the prompt generation module(s) 245 can control the active I/O system(s) 215 to render the notification. The notification can direct a person to exit or enter the vehicle 105 for continuing the guided tour 100. For example, where the transition location 125 is for a transition from an in-vehicle segment 115 of a guided tour 100 to an out-of-vehicle segment 120, the notification can direct an occupant of the vehicle 105 to exit the vehicle 105 for continuing the guided tour 100. Similarly, where the transition location 125 is for a transition from an out-of-vehicle segment 120 of a guided tour 100 to an in-vehicle segment 115, the notification can direct an occupant of the vehicle 105 to enter the vehicle 105 for continuing the guided tour 100. The method can continue from function block 440 to function block 445.

At function block 445, the prompt generation module(s) 245 can electronically select an active I/O system 215 from each of the I/O system(s) 215 that is to be used to render prompts. For example, the prompt generation module(s) 245 can switch from vehicle I/O system(s) 215 to device I/O system(s) 215 when the transition location 125 is a transition from an in-vehicle segment 115 of a guided tour 100 to an out-of-vehicle segment 120. Similarly, the prompt generation module(s) 245 can switch from device I/O system(s) to vehicle I/O system(s) 215 when the transition location 125 is a transition from an out-of-vehicle segment 120 of a guided tour 100 to in-vehicle segment 115.

From both function block 445 and decision block 435 (when the current tour is determined to not be located at a transition location 125), the method can continue to decision block 450.

At decision block 450, the route planning module(s) 225 can electronically determine whether there are any subsequent POIs 110 along the route 135 for the guided tour 100. If there are subsequent POIs 110 on the guided tour 100, the method can continue back to function block 415. However, if there are not any subsequent POIs 110 on the guided tour 100, the method can proceed to ending block 455.

At ending block 455, the method can end. The method can end when the guided tour 100 is complete (e.g., there are no subsequent POIs 110).

FIG. 2 will now be discussed in full detail as an example environment within which the system and methods disclosed herein may operate. The following description corresponds to various examples where one or more vehicles in the disclosed system are autonomous and/or semi-autonomous. Therefore, the following description will be described in reference to the vehicle 105 being autonomous (or semi-autonomous). However, it should be understood that, in some instances, vehicles can be manually operated. Accordingly, the present disclosure is not limited to either arrangement.

In some instances, the vehicle 105 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 105 can be a conventional vehicle that is configured to operate in only a manual mode.

In one or more examples, the vehicle 105 is an autonomous vehicle. As used herein, "autonomous vehicle" refers to a vehicle that operates in an autonomous mode. "Autonomous mode" refers to navigating and/or maneuvering the vehicle 105 along a travel route using one or more computing systems to control the vehicle 105 with minimal or no input from a human driver. In one or more examples, the vehicle 105 is highly automated or completely automated. In one example, the vehicle 105 is configured with one or more semi-autonomous operational modes in which one or more computing systems perform a portion of the navigation and/or maneuvering of the vehicle along a travel route, and a vehicle operator (i.e., human driver) provides inputs to the vehicle to perform a portion of the navigation and/or maneuvering of the vehicle 105 along a path.

In one or more arrangements, the vehicle 105 can include or otherwise access memory 210. The memory 210 can include map data. The map data can include maps of one or more geographic areas. In some instances, the map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can be high quality and/or highly detailed.

In one or more arrangements, the map data can include one or more terrain maps. The terrain map(s) can include information about the ground, terrain, roads, surfaces, and/or other features of one or more geographic areas. The terrain map(s) can include elevation data in the one or more geographic areas. The map data can be high quality and/or highly detailed. The terrain map(s) can define one or more ground surfaces, which can include paved roads, unpaved roads, land, and other things that define a ground surface.

In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills, etc. The static obstacles can be objects that extend above ground level. The one or more static obstacles included in the static obstacle map(s) can have location data, size data, dimension data, material data, and/or other data associated with it. The static obstacle map(s) can include measurements, dimensions, distances, and/or information for one or more static obstacles. The static obstacle map(s) can be high quality and/or highly detailed. The static obstacle map(s) can be updated to reflect changes within a mapped area.

The memory 210 can include sensor data. In this context, "sensor data" means any information about the sensors that the vehicle 105 is equipped with, including the capabilities and other information about such sensors. As will be explained below, the vehicle 105 can include the sensor system. The sensor data can relate to one or more sensors of the sensor system.

In some instances, at least a portion of the map data and/or the sensor data can be located in memory 210 located on-board the vehicle 105. Alternatively, or in addition, at least a portion of the map data and/or the sensor data can be located in memory 210 that is located remotely from the vehicle 105.

As noted above, the vehicle 105 can include the sensor system. The sensor system can include one or more sensors. In arrangements in which the sensor system includes a plurality of sensors, the sensors can work independently from each other. Alternatively, two or more of the sensors can work in combination with each other. In such case, the two or more sensors can form a sensor network. The sensor system and/or the one or more sensors can be operatively connected to the processor(s) 205 for the vehicle 105, the memory 210, and/or another element of the vehicle 105. The sensor system can acquire data of at least a portion of the external environment of the vehicle 105 (e.g., the present context).

The sensor system can include any suitable type of sensor. Various examples of different types of sensors will be described herein. However, it will be understood that the examples are not limited to the particular sensors described. The sensor system can include one or more vehicle sensors. The vehicle sensor(s) can detect, determine, and/or sense information about the vehicle 105 itself. In one or more arrangements, the vehicle sensor(s) can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) can be configured to detect, and/or sense one or more characteristics of the vehicle 105. In one or more arrangements, the vehicle sensor(s) can include a speedometer to determine a current speed of the vehicle 105.

Alternatively, or in addition, the sensor system can include one or more external environment sensors configured to acquire, and/or sense driving environment data. "Driving environment data" includes data and/or information about the external environment in which an autonomous vehicle is located or one or more portions thereof. For example, the one or more external environment sensors can be configured to detect, quantify and/or sense obstacles in at least a portion of the external environment of the vehicle 105 and/or information/data about such obstacles. Such obstacles can be stationary objects and/or dynamic objects. The one or more external environment sensors can be configured to detect, measure, quantify and/or sense other things in the external environment of the vehicle 105, such as, for example, lane markers, signs, traffic lights, traffic signs, lane lines, crosswalks, curbs, off-road objects, etc., proximate the vehicle 105.

Various examples of sensors of the sensor system will be described herein. The example sensors can be part of the one or more external environment sensors and/or the one or more vehicle sensors. However, it will be understood that the examples are not limited to the particular sensors described.

As an example, in one or more arrangements, the sensor system can include one or more radar sensors, one or more LIDAR sensors, one or more sonar sensors, and/or one or more cameras. In one or more arrangements, the one or more cameras can be high dynamic range (HDR) cameras or infrared (IR) cameras. In one or more arrangements, the one or more cameras can be hyperspectral cameras.

As stated above, the vehicle 105, in some arrangements, includes an I/O system(s) 215. An "input system" includes any device, component, system, element or arrangement or groups thereof that enable information/data to be entered into a machine. The input system can receive an input from a vehicle occupant (e.g. a driver or a passenger). An "output system" includes any device, component, or arrangement or groups thereof that enable information/data to be presented to a vehicle occupant (e.g. a person, a vehicle passenger, etc.). The input system and output system can together make up the I/O system(s) 215.

The vehicle 105 can include one or more vehicle systems. Various examples of the one or more vehicle systems will be described herein. However, the vehicle 105 can include more, fewer, or different vehicle systems. It should be appreciated that although particular vehicle systems are separately defined, each or any of the systems or portions thereof can be otherwise combined or segregated via hardware and/or software within the vehicle 105. The vehicle 105 can include a propulsion system, a braking system, a steering system, throttle system, a transmission system, a signaling system, and/or a navigation system. Each of these systems can include one or more devices, components, and/or combination thereof, now known or later developed.

The navigation system can include one or more devices, applications, and/or combinations thereof, now known or later developed, configured to determine the geographic location of the vehicle 105 and/or to determine a travel route for the vehicle 105. The navigation system can include one or more mapping applications to determine a path for the vehicle 105. The navigation system can include a global positioning system, a local positioning system or a geolocation system.

The vehicle 105 can include one or more modules, at least some of which are described herein. The modules can be implemented as computer-readable program code that, when executed by the processor(s) 205, implement one or more of the various processes or functions described herein. One or more of the modules can be a component of the processor(s) 205, or one or more of the modules can be executed on and/or distributed among other processing systems to which the processor(s) 205 is operatively connected. The modules can include instructions (e.g., program logic) executable by one or more processor(s) 205. Alternatively, or in addition, the memory 210 can contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 105 can include one or more automated control modules 230. The automated control module(s) 230 can communicate with the various vehicle systems. In one or more arrangements, the processor(s) 205 and/or automated control module(s) 230 can be operatively connected to communicate with the various vehicle systems and/or individual components thereof. For example, the processor(s) 205 of the vehicle 105 and/or the automated control module(s) 230 can be in communication to send and/or receive information from the various vehicle systems to control the movement, speed, maneuvering, heading, direction, etc. of the vehicle 105. The processor(s) 205 of the vehicle 105 and/or the automated control module(s) 230 can control some or all of these vehicle systems and, thus, the vehicle 105 can be partially or fully autonomous.

The processor(s) 205 and/or the automated control module(s) 230 can control the navigation and/or maneuvering of the vehicle 105 by controlling one or more of the vehicle systems and/or components thereof. For instance, when operating in an autonomous or semi-autonomous mode, the processor(s) 205 and/or the automated control module(s) 230 can control the direction and/or speed of the vehicle 105. The processor(s) 205 and/or the automated control module(s) 230 can cause the vehicle 105 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 105 can include one or more vehicle actuators. The vehicle actuators can be any element or combination of elements operable to modify, adjust and/or alter one or more of the vehicle systems or components thereof responsive to receiving vehicle control signals or other inputs from the processor(s) 205 and/or the automated control module(s) 230. Any suitable actuator can be used. For instance, the one or more vehicle actuators can include motors, pneumatic actuators, hydraulic pistons, relays, solenoids, and/or piezoelectric actuators, just to name a few possibilities.

The automated control module(s) 230 can determine path(s), current autonomous driving maneuvers for the vehicle 105, future autonomous driving maneuvers and/or modifications to current autonomous driving maneuvers based on data acquired by the sensor(s) 235, driving scene models, and/or data from any other suitable source.

The automated control module(s) 230 can determine one or more driving maneuvers to follow the selected path for the vehicle 105. "Driving maneuver" means one or more actions that affect the movement of a vehicle. Examples of driving maneuvers include: accelerating, decelerating, braking, turning, moving in a lateral direction of the vehicle 105, changing travel lanes, merging into a travel lane, and/or reversing, just to name a few possibilities. The automated control module(s) 230 can be configured to implement the determined driving maneuvers. The automated control module(s) 230 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 230 can execute various vehicle functions and/or to transmit data to, receive data from, interact with, and/or control the vehicle 105 or one or more systems thereof (e.g. one or more of vehicle systems).

Detailed examples are disclosed herein. However, it is to be understood that the present disclosure is only intended for purposes of providing examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-5, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied, e.g., stored, thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++, or the like, and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one, or more than one. The term "plurality," as used herein, is defined as two, or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A guided tour system for providing electronically guided tours that include one or more points of interest (POIs), comprising:
a processor; and
memory operatively connected to the processor, the memory storing:
a route planning module including instructions that, when executed by the processor, cause the processor to:
select one or more POIs for a guided tour route;
identify at least one in-vehicle segment and at least one out-of-vehicle segment in the guided tour route;
identify at least one transition location, wherein the at least one transition location is a location where the guided tour route transitions between the at least one in-vehicle segment and the at least one out-of-vehicle segment;
a prompt generation module including instructions that, when executed by the processor, cause the processor to:
responsive to determining that a current tour is located at the at least one transition location along the guided tour route,
select an active Input/Output (I/O) system to be controlled for rendering prompts during an upcoming segment of the guided tour route, wherein the prompt generation module includes instructions to select the active I/O system from a plurality of I/O systems including at least one device I/O system and a vehicle I/O system as a function of, at least, a previous segment; and
render one or more prompts for the upcoming segment using the active I/O system as selected according to, at least, the previous segment.

2. The guided tour system of claim 1, wherein the at least one transition location is a location along the guided tour route at which the processor, according to the instructions included on the prompt generation module, transitions between providing the prompts on the at least one device I/O system and the vehicle I/O system by selecting upon which of the plurality of I/O systems to render the prompts for the guided tour route including an out-of-vehicle segment and an in-vehicle segment.

3. The guided tour system of claim 2, wherein the prompt generation module includes instructions to render the prompts for the out-of-vehicle segment on the device I/O system and thereby conduct the current tour independent of a vehicle using the at least one device I/O system instead of the vehicle I/O system, and wherein the at least one device I/O system is integrated within a respective mobile device.

4. The guided tour system of claim 2, wherein the prompt generation module includes instructions to render the prompts for the in-vehicle segment on the vehicle I/O system integrated within a vehicle, and thereby conduct the current tour from within the vehicle using the vehicle I/O system instead of the at least one device I/O system.

5. The guided tour system of claim 1, wherein the prompt generation module includes instructions to render the one or more prompts for the upcoming segment that is after the at least one transition location on a different one of the plurality of I/O systems than the previous segment.

6. The guided tour system of claim 1, wherein the prompt generation module includes instructions to select the one or more prompts to render based, at least in part, on one or more of a proximity between two or more proximity sensors, and one or more preferences associated with a user profile.

7. The guided tour system of claim 1, wherein the one or more prompts are rendered for the upcoming segment responsive to determining the current tour is located at a POI along the upcoming segment.

8. The guided tour system of claim 1, wherein a location of the current tour is determined based, at least in part, on data from a location sensor integrated within any one of a vehicle and a mobile device.

9. The guided tour system of claim 1, wherein the memory further stores:
a vehicle management module including instructions that, when executed by the processor, cause the processor to:
identify a pick-up location along the guided tour route, wherein the pick-up location is the same as the at least one transition location; and
an automated control module including instructions that, when executed by the processor, cause the processor to:
cause an automated vehicle to drive from its current location to the pick-up location to pick-up a user and continue to a next POI of the one or more POIs on the guided tour route.

10. The guided tour system of claim 1, wherein the route planning module includes instructions to
select, from a plurality of POIs, the one or more POIs for the guided tour route based, at least, on one or more of user preferences, handicap accessibility, and typical foot traffic; and
list the one or more POIs for the guided tour route on the active I/O system.

11. A non-transitory computer readable medium storing instructions that, when executed by one or more processors, cause the one or more processors to:
select one or more points of interest (POIs) for a guided tour route;
identify at least one in-vehicle segment and at least one out-of-vehicle segment in the guided tour route;
identify at least one transition location, wherein the at least one transition location is a location where the guided tour route transitions between the at least one in-vehicle segment and the at least one out-of-vehicle segment;
determine a location of a current tour along the guided tour route;
in response to determining the current tour is located at the at least one transition location along the guided tour route,
select an active Input/Output (I/O) system to be controlled for rendering prompts during an upcoming segment of the guided tour route, wherein the active I/O system is selected from a plurality of I/O systems including at least one device I/O system and a vehicle I/O system as a function of, at least, a previous segment and the at least one transition location; and
render one or more prompts for the upcoming segment using the active I/O system as selected according to, at least, the previous segment and the at least one transition location.

12. The non-transitory computer readable medium of claim 11, further storing instructions to:
select the one or more prompts to render via the active I/O system from a plurality of prompts associated with a POI, the one or more prompts being selected based, at least in part, on data from a user profile, the data corresponding to user preferences; and
wherein the one or more prompts are rendered for the upcoming segment in response to determining the current tour is located at the POI located along the upcoming segment.

13. A method of electronically controlling a providing of prompts for a guided tour, the method comprising:
selecting one or more points of interest (POIs) for a guided tour route;
identifying at least one in-vehicle segment and at least one out-of-vehicle segment in the guided tour route;
identifying at least one transition location, wherein the at least one transition location is a location where the guided tour route transitions between the at least one in-vehicle segment and the at least one out-of-vehicle segment;
determining a location of a current tour along the guided tour route;
in response to determining the current tour is located at the at least one transition location along the guided tour route,
selecting an active Input/Output (I/O) system to be controlled for rendering prompts during an upcoming segment of the guided tour route, wherein the active I/O system is selected from a plurality of I/O systems including a device I/O system and a vehicle I/O system as a function of, at least, a previous segment and the at least one transition location; and
rendering one or more prompts for the upcoming segment using the active I/O system according to, at least, the previous segment and the at least one transition location.

14. The method of claim 13, further comprising:
in response to determining the current tour is located at the at least one transition location, controlling at least one of the plurality of I/O systems to provide a notification that directs one or more persons to exit or enter a vehicle for continuing the guided tour route.

15. The method of claim 13, wherein determining the location of the current tour includes determining the location of the current tour along the guided tour route including the one or more POIs based, at least in part, on data from a location sensor integrated within any of a mobile device and a vehicle.

16. The method of claim 13, wherein the one or more prompts are rendered for the upcoming segment in response to determining the current tour is located at a POI along the upcoming segment.

17. The method of claim 16, further comprising:
selecting the one or more prompts to render using the active I/O system from a plurality of prompts associated with the POI, the one or more prompts being selected based, at least in part, on one or more of a determined proximity of a plurality of proximity sensors, and data from a user profile, the data corresponding to user preferences.

18. The method of claim 13, wherein the at least one transition location is a point along the guided tour route where the guided tour route switches from an in-vehicle segment to an out-of-vehicle segment, and wherein selecting the active I/O system to be controlled comprises:
- selecting the device I/O system to be controlled for rendering prompts during the out-of-vehicle segment of the guided tour route and thereby conduct the current tour using the device I/O system instead of the vehicle I/O system while the current tour is determined to be located along the out-of-vehicle segment, and wherein the device I/O system is integrated within a mobile device.

19. The method of claim 13, wherein the at least one transition location is a point along the guided tour route where the current tour switches from an out-of-vehicle segment to an in-vehicle segment, and wherein selecting the active I/O system to be controlled comprises:
- selecting the vehicle I/O system to be controlled for providing the prompts during the in-vehicle segment of the guided tour route, the vehicle I/O system being integrated within a vehicle, and thereby conduct the current tour from within the vehicle using the vehicle I/O system instead of the device I/O system while the current tour is determined to be located along the in-vehicle segment.

20. The method of claim 13, further comprising:
- controlling at least one of the plurality of I/O systems to display a route for one or more persons to follow for continuing the guided tour route.

* * * * *